United States Patent [19]

Güttner et al.

[11] Patent Number: 4,560,624

[45] Date of Patent: Dec. 24, 1985

[54] MAGNETIC RECORDING MEDIA WITH A DUAL PROTECTIVE COATING OF SILICON MONOXIDE AND CHROMIUM

[75] Inventors: Christine Güttner, Heidelberg; Peter Heilmann, Bad Durkheim; Udo Kullmann, Dirmstein, all of Fed. Rep. of Germany; Dieter Mayer, Sudbury, Mass.; Werner Grau, Bobenheim-Roxheim, Fed. Rep. of Germany

[73] Assignee: BASF Aktiengesellschaft, Fed. Rep. of Germany

[21] Appl. No.: 676,179

[22] Filed: Nov. 29, 1984

[30] Foreign Application Priority Data

Nov. 29, 1983 [DE] Fed. Rep. of Germany ....... 3343107

[51] Int. Cl.$^4$ ..................... C03C 29/00; H01F 10/10
[52] U.S. Cl. .................... 428/632; 428/621; 428/660
[58] Field of Search ...................... 428/632, 621, 660; 29/194

[56] References Cited

U.S. PATENT DOCUMENTS

| | | | |
|---|---|---|---|
| 3,342,632 | 9/1967 | Bate et al. | 117/217 |
| 3,342,633 | 9/1967 | Bate et al. | 117/217 |
| 3,353,166 | 11/1967 | Brock | 340/174.1 |
| 3,767,369 | 10/1973 | Barlow et al. | 29/194 |
| 4,029,541 | 6/1977 | Barlow et al. | 427/130 |
| 4,122,239 | 10/1978 | Riboulet et al. | 428/621 |
| 4,268,369 | 5/1981 | Barlow et al. | 204/192 |
| 4,277,540 | 7/1981 | Aine | 428/627 |
| 4,287,225 | 9/1981 | Kneller et al. | 427/48 |

Primary Examiner—Veronica O'Keefe
Attorney, Agent, or Firm—Keil & Weinkauf

[57] ABSTRACT

Magnetic recording media possess, on a dimensionally stable base which may or may not be provided with a non-magnetic lower layer, a thin ferromagnetic metal layer on which a protective layer consisting of a silicon monoxide/chromium dual coating is applied.

3 Claims, No Drawings

MAGNETIC RECORDING MEDIA WITH A DUAL PROTECTIVE COATING OF SILICON MONOXIDE AND CHROMIUM

The present invention relates to magnetic recording media which possess, on a dimensionally stable base which may or may not be provided with a non-magnetic lower layer, a thin ferromagnetic metal layer on which a protective layer is applied.

The magnetic layers of the conventional recording media consist of magnetic oxide or metal particles finely dispersed in polymeric organic binders. However, a limit is imposed on the thickness in which layers of this type can be produced, by coating techniques and the requisite pigment loading. In efforts to increase the recording density of the magnetic recording media, particularly in the field of data processing, where only very thin layers meet the requirement in respect of high recording density, it has been suggested that thin ferromagnetic metal layers be used as recording layers. Chemically or electrolytically deposited ferromagnetic metal or alloy layers, in particular of cobalt and/or nickel or phosphorus, and ferromagnetic layers of the corresponding metals or alloys including iron, cobalt, nickel, chromium and rare earths, which have been applied to the base by vapor deposition or sputtering have been disclosed.

Recording media of this type are used mainly in the form of disks, as storage media in disk drives, in which the disks rotate at high speed, generally at 3600 rpm. The heads used for recording fly 0.5–1 $\mu$m above the disk, since the high relative velocity and the special shape of the head produce an air cushion between the head and the disk, the head being supported by the air cushion. The flying height depends on the relative velocity. Before the apparatus is set in operation, the head rests directly on the disk. Head/disk contact also occurs when the apparatus is switched off. Hence, the surface of the disk must be such that it withstands a large number of such head/disk contacts without being damaged. With a view to achieving higher recording densities, attempts have been made to reduce the flying height, with the result that head crashes may occur even during normal operation. In order to avoid damage to the magnetic layer of the recording medium, it is all the more important for the surface to be mechanically stable.

This means that the surface of the magnetic layer must possess excellent corrosion resistance and abrasion resistance. However, since the ferromagnetic metal layers which are suitable for the recording layers do not possess these properties, it is necessary to provide a protective layer. The latter must consist of a material which is both hard and suitable for producing thin homogeneous layers which also adhere very firmly to the magnetic layer being protected. Moreover, in choosing such a protective layer, care must be taken to ensure that the magnetic layer is not adversely affected in any way, either by the application of the protective layer or by the protective layer itself.

With the aim of solving these problems, a large number of suggestions have already been made. For example, U.S. Pat. No. 3,767,369 describes the application of a rhodium protective layer for improving the hardness and the frictional properties, a tin/nickel intermediate layer having to be applied in order to improve the excessively low adhesion of the rhodium to the magnetic layer. The properties of the protective layer produced by this method do not meet present-day requirements, and the said layer cannot be applied simply and without problems. For any case in which the metallic magnetic layer is cobalt-containing, it has been suggested that this magnetic layer be heated in air at a prescribed humidity level, and hence oxidized on the surface (U.S. Pat. Nos. 3,353,166 and 4,029,541). However, such a process has particular disadvantages. For example, a heating process which is required for the manufacture of the stated protective layers can affect the magnetic properties of the recording layer itself as well as influence lower or intermediate layers, which are conventionally employed, in such a way that these in turn have an adverse effect on the properties of the magnetic layer. Where relatively high baking temperatures are employed, crystallites form in, for example, amorphous nickel lower layers, as are conventionally used for cobalt, cobalt/phosphorus or cobalt/nickel/phosphorus magnetic layers; these crystallites impart magnetic properties to parts of the nickel lower layer, which is non-magnetic per se, with the result that the recording layer on top of it is affected.

In other processes, various protective layers are applied under reduced pressure, generally by sputtering, for example layers of gold, tantalum, niobium, platinum, chromium, tungsten, rhodium and the nitrides and carbides of silicon, zirconium, hafnium and titanium (according to U.S. Pat. No. 4,277,540), and layers of silicon dioxide (according to U.S. Pat. No. 4,268,369).

Although all of these protective layers result in an improvement with regard to the particular problem being solved, they cannot satisfy requirements with respect to all properties, in particular abrasion resistance, frictional properties, durability and corrosion resistance, without having an adverse effect on the recording properties of the magnetic layer.

It is an object of the present invention to provide magnetic recording media, having a thin ferromagnetic metal layer as the magnetic layer, with a protective layer which does not possess the above disadvantages, ie. is particularly hard-wearing and corrosion-resistant without influencing the recording properties of the magnetic layer.

We have found that this object is achieved, and that magnetic recording media which possess, on a dimensionally stable base which may or may not be provided with a non-magnetic lower layer, a thin ferromagnetic metal layer on which a protective layer is applied meet the requirements set, if the protective layer is in the form of a dual coating of chromium and silicon monoxide.

In particular, the novel ferromagnetic recording media consist of a dimensionally stable base, which may or may not be provided with a non-magnetic lower layer, a 300–500 Å thick ferromagnetic metal layer which is applied on the base, and the 200–5000 Å thick protective layer consisting of a silicon monoxide/chromium dual coating. It is particularly advantageous if the first layer of chromium is from 100 to 1000, preferably from 100 to 250, Å thick, and the second layer of silicon monoxide is from 100 to 4900, preferably from 200 to 500, Å thick.

The magnetic recording media according to the invention are distinguished by the protective layer in the form of a dual coating of silicon monoxide and chromium. Their structure, comprising a base, with or without a non-magnetic lower layer, and a ferromagnetic metal layer, is known per se.

Suitable dimensionally stable bases for the magnetic recording media are all conventional bases which can be used for thin magnetic metal layers and are substantially dimensionally stable to 300° C. or higher. Disks made of aluminum or aluminum alloys and having the usual thicknesses are preferred. Bases of other metals and plastics, eg. copper, and polyimide or polyethylene terephthalate films, can also be used.

In order to produce a suitable magnetic layer, the base is generally provided with a non-magnetic lower layer. Layers which are known and are particularly suitable for the intended uses are chemically or autocatalytically deposited amorphous nickel/phosphorus alloy layers containing from 7 to 11% by weight of phosphorus. The layers are usually from 5 to 50, in particular from 10 to 30, $\mu$m thick.

The non-magnetic lower layers applied in this manner provide excellent corrosion protection for the aluminum disks but, in particular, effect a substantial improvement in the machinability of the surface compared with the uncoated aluminum substrate. Because of the substantially greater hardness of the chemically deposited NiP layer, appropriate polishing or lapping processes can be used to obtain surfaces which are substantially smoother and hence more suitable than those produced on uncoated substrates.

Suitable thin ferromagnetic metal layers are the conventional ones which are about 300–1500 Å thick and are produced in a conventional manner by chemical deposition or electrolytic deposition, or by vapor deposition or sputtering, ie. deposition of the metals or metal alloys from the gas phase under greatly reduced pressure onto the base which may or may not have been pretreated.

Suitable cobalt-containing thin ferromagnetic metal layers are, in particular, cobalt/phosphorus and cobalt/boron alloys, cobalt/nickel, cobalt/nickel/iron and cobalt/iron alloys and phosphorus-containing, boron-containing and/or nitrogen-containing alloys of the stated type, eg. alloys consisting of about 95–98% of cobalt and 2–10% of phosphorus, of about 30–20% of nickel and 70–80% of cobalt, of about 90% of cobalt, 9% of nickel and 1% of phosphorus, of about 88% of cobalt, 9% of nickel and 3% of boron, or of about 40–50% of cobalt, 40–50% of nickel and 1–5% of boron. Using the alloys, it is possible, for example by means of chemical deposition onto substrates which are preferably polished, to produce films which are less than 0.6 $\mu$m thick and have, for example, a coercive force of from 20 to 75 kA/m and a magnetization of from 1 to 1.5 Tesla.

A particularly preferred ferromagnetic metal layer consists of from 90 to 98.5% of cobalt and from 1.5 to 10% of phosphorus, and is applied in a thickness of from 0.08 to 0.5 $\mu$m onto a nickel-plated aluminum alloy base by electrolytic or chemical deposition.

In the same manner, magnetic recording media having storage layers consisting of a SmCo alloy can also be provided with the novel protective layer. SmCo storage layers of this type have been disclosed, as has their manufacture (U.S. Pat. No. 4,287,225). This also applies to the amorphous iron nitride films produced by sputtering, according to European Patent Application No. 8328. Other suitable storage layers which can be provided with the protective layer, in accordance with the object of the invention, are the layers which are described in German Published Application DAS No. 1,521,315, consist of iron, cobalt, nickel or alloys of these, and are produced by an oblique incidence vacuum deposition method. The iron/cobalt alloy layers (German Laid-Open Application DOS No. 2,347,540) described as storage layers for data magnetic disks are also improved by the novel chromium/silicon monoxide protective layers.

The protective layer, in the form of a dual coating, is applied onto the conventional ferromagnetic metal layers which are suitable as recording layers. The protective layer is applied by vaporization of the appropriate materials, ie. Cr and SiO, in an apparatus under reduced pressure. Hence, this method is particularly advantageous for magnetic layers which are themselves produced in an apparatus under reduced pressure. However, this method can be used equally well for coating storage layers produced by other processes. The pressure in the vacuum apparatus in which the protective layer is applied should be from $10^{-4}$ to $10^{-5}$ mm Hg, in order to ensure that the number of extraneous atoms incorporated in the layer is small. After reduction of the pressure, the two components of the protective layer are applied in succession. To do this, chromium is first applied by vapor deposition, chromium preferably being vaporized from a water-cooled copper crucible by means of an electron beam. The second layer, consisting of silicon monoxide, is then vaporized either by means of the electron beam or from a resistance heater. In the process, it is advantageous if the substrate provided with the storage layer is rotated during the vapor deposition, in order to obtain a layer of very uniform thickness over its entire surface. The total layer thickness can be controlled and adjusted via a crystal monitor.

The novel magnetic recording media obtained in this manner have a surface exhibiting excellent mechanical strength which manifests itself in particularly good resistance to head contacts such as occur, in particular, during the starting-up and stopping phases in the course of repeated use of the reducing medium. Furthermore, the protective layer renders the thin magnetic metal layers of the novel magnetic recording media very stable to corrosion by air or atmospheric humidity. However, it is not only the combination of the two improvements which is important, but in particular the fact that improvement has been effected without the magnetic properties of the recording layer being adversely affected, as is generally the case in the prior art. In addition to these advantageous effects of the protective layer, it was found, surprisingly, that, because the protective layer is in the form of a dual coating, magnetostrictive losses are reduced, since the shearing stresses exerted by the head on the magnetic layer when head/disk contacts occur are substantially decreased.

The Examples which follow illustrate the invention.

EXAMPLE 1

The protective layer was applied in the following manner onto polished nickel-plated aluminum disks which had been provided with a 0.06 $\mu$m thick phosphorus-containing Co layer by chemical deposition (amount of phosphorus in the layer: 3% by weight). The disk was introduced into the vacuum apparatus, which was then brought to a residual gas pressure of $2\times10^{-6}$ mm Hg. The distance between the vaporizing sources and the disk was 50 cm, so that it was possible to keep exposure of the disk to heat radiation at a very low level. The two strata of the protective layer were then applied in succession by vapor deposition, ie. first a 200 Å thick chromium layer, and then a 500 Å thick SiO layer. For chromium vaporization, 3 kW was required in order to carry out deposition at a rate of 10 Å/sec, while for SiO 5 Å/sec was achieved using 1 kW.

The top layer produced in this manner made the disk resistant to more than 20,000 start and landing cycles of the head on a track during operation in a commercial disk drive. This also applied when the disk had been stored for 14 days in a cabinet at 65° C. and 80% relative humidity. In the case of a magnetic disk without such a top layer, corrosion occurred under such conditions and hence made flight over the disk impossible.

COMPARATIVE EXAMPLE 1

A magnetic disk which was produced as described in Example 1 but was provided only with the 0.06 μm CoP magnetic layer (i.e. no protective layer was applied) was subjected to the start-stop test. After 2,400 start-stop contacts, the magnetic layer was found to be destroyed at the points of contact.

EXAMPLE 2

A chromium layer and then an SiO layer were applied, as described in Example 1, onto a magnetic disk produced as described in Example 3 of U.S. Pat. No. 4,287,225 and possessing a CoSm storage layer. With this disk, it was possible to achieve 20,000 start-stop contacts between the head and a track, in a commercial disk drive.

COMPARATIVE EXAMPLE 2

A magnetic disk produced as described in Example 3 of U.S. Pat. No. 4,287,225, no protective layer being applied, was subjected to the start-stop test. After 3,000 start-stop contacts, the magnetic layer was found to be destroyed.

We claim:

1. A magnetic recording medium which possesses, on a dimensionally stable base which may or may not be provided with a non-magnetic lower layer, a thin ferromagnetic metal layer on which a protective layer is applied, wherein the protective layer is in the form of a dual coating of chromium and silicon monoxide.

2. A magnetic recording medium as claimed in claim 1, wherein on the 300–1500 Å thick ferromagnetic metal layer, the protective layer in the form of a dual coating is from 200 to 5000 Å thick.

3. A magnetic recording medium as claimed in claim 2, wherein a first, 100–1000 Å thick layer of chromium and a second, 100–4900 Å thick layer of silicon monoxide are applied onto a 300–1500 Å thick ferromagnetic metal layer.

* * * * *